United States Patent
Chen

(10) Patent No.: US 11,298,757 B2
(45) Date of Patent: Apr. 12, 2022

(54) FIRMLY ASSEMBLED CUTTER HOLDING ASSEMBLY

(71) Applicant: SHIN-YAIN INDUSTRIAL CO., LTD., Taichung (TW)

(72) Inventor: Pen-Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 209 days.

(21) Appl. No.: 16/875,227

(22) Filed: May 15, 2020

(65) Prior Publication Data

US 2021/0354214 A1    Nov. 18, 2021

(51) Int. Cl.
| B23C 5/26 | (2006.01) |
| B23C 5/06 | (2006.01) |
| B23C 5/20 | (2006.01) |

(52) U.S. Cl.
CPC .............. B23C 5/06 (2013.01); B23C 5/207 (2013.01); B23C 5/26 (2013.01); B23C 2210/02 (2013.01)

(58) Field of Classification Search
CPC ........ B23B 2260/004; B23B 2260/026; B23B 2265/08; B23B 31/008; B23B 31/4006; B23B 5/26; F16B 39/22; F16D 1/0882; F16D 1/0888; F16D 1/095; F16D 2001/0903; B23C 2210/02; B23C 2240/24; B23C 2250/04; B23C 2250/16; B23C 2270/06; B23C 2251/02; B23C 5/26; B23C 5/06; B23C 5/20; B23C 5/207; B23D 2277/02

See application file for complete search history.

(56) References Cited

U.S. PATENT DOCUMENTS

| 1,363,310 | A | * | 12/1920 | Christopher | ........ B23B 31/4006 82/169 |
| 2,612,376 | A | * | 9/1952 | Wollner | .............. B23B 31/4006 279/2.12 |
| 2,656,193 | A | * | 10/1953 | Irrgang | ............. B23B 31/16054 279/66 |
| 3,339,458 | A | * | 9/1967 | Thurston | ................... B23C 5/26 409/234 |
| 3,819,193 | A | * | 6/1974 | Kyriakou | ............ B23B 31/4006 279/2.03 |
| 3,969,034 | A | * | 7/1976 | Gaul | ................... B60B 27/0026 403/357 |

(Continued)

*Primary Examiner* — Nicole N Ramos
(74) *Attorney, Agent, or Firm* — Rabin & Berdo, P.C.

(57) ABSTRACT

A cutter holding assembly has a holder, a cutter, and a tightening positioning assembly. The holder has a first positioning recess. The cutter is connected to the holder and has a second positioning recess. The tightening positioning assembly has a positioning block, two tightening elements, and an adjusting element. The positioning block is mounted in the first positioning recess of the holder and the second positioning recess of the cutter. The tightening elements are mounted in two opposite sides of the positioning block. The adjusting element is mounted in the positioning block at a position between the two tightening elements. The adjusting element has a conical abutting surface for pushing the tightening elements to move opposite to each other to abut the opposite side surfaces of one of the first and the second positioning recesses while axially moving. The cutter can be firmly connected to the holder.

16 Claims, 7 Drawing Sheets

(56) References Cited

U.S. PATENT DOCUMENTS

| | | | | |
|---|---|---|---|---|
| 4,575,292 A * | 3/1986 | Pape | B23B 31/008 | 279/97 |
| 4,884,483 A * | 12/1989 | Keim | B23B 31/008 | 82/160 |
| 4,945,793 A * | 8/1990 | von Haas | B23B 29/046 | 82/157 |
| 5,245,896 A * | 9/1993 | Erickson | C07K 14/475 | 82/160 |
| 5,542,792 A * | 8/1996 | Krueger | B23B 31/1072 | 407/35 |
| 5,595,540 A * | 1/1997 | Rivin | F16D 3/04 | 464/102 |
| 5,845,912 A * | 12/1998 | Grupa | B23B 31/16275 | 279/124 |
| 6,386,806 B1 * | 5/2002 | Planche | B23B 31/008 | 279/77 |
| 8,584,556 B2 * | 11/2013 | Heinloth | B23C 3/06 | 82/106 |
| 2002/0057951 A1 * | 5/2002 | Silver | B23B 51/02 | 408/1 R |
| 2005/0117988 A1 * | 6/2005 | Stojanovski | B23B 31/113 | 409/234 |
| 2008/0185792 A1 * | 8/2008 | Hopfner | B23B 31/1176 | 279/2.06 |
| 2009/0256318 A1 * | 10/2009 | Stolz | B23B 31/1077 | 279/28 |
| 2009/0279973 A1 * | 11/2009 | Erickson | B23B 31/06 | 408/240 |
| 2011/0262232 A1 * | 10/2011 | Chen | B23B 29/046 | 407/46 |
| 2015/0330434 A1 * | 11/2015 | Stjernstedt | B23B 31/008 | 403/320 |
| 2018/0009042 A1 * | 1/2018 | Chen | B23B 31/11 | |

* cited by examiner

FIRMLY ASSEMBLED CUTTER HOLDING ASSEMBLY

BACKGROUND OF THE INVENTION

1. Field of the Invention

The present invention relates to a cutter holding assembly for a machining tool, and more particularly to a cutter holding assembly which has a holder and a cutter connected with each other firmly and tightly.

2. Description of Related Art

A conventional cutter holding assembly has a holder, a cutter, and a fastener. The cutter surrounds a front end of the holder, and is fixed on the holder via the fastener mounted through the cutter and screwed with the holder. To prevent the cutter from rotating relative to the holder, two positioning blocks are respectively mounted in diametrically opposite sides of the holder, protrude from an end surface of the holder, and are respectively inserted into and engage with two positioning recesses formed in diametrically opposite sides of the cutter. A width of each positioning recess is slightly larger than a width of each positioning block for easily inserting the positioning blocks into the positioning recesses. For example, if the width of each positioning block is 15.9 millimeters, the width of each positioning recess will be 16.4 millimeters. Because of assembly gaps formed between the positioning recesses and the positioning blocks, the conventional cutter holding assembly has poor balance and vibration problem during rapid spinning. Machining accuracy of the machining tool is reduced.

To overcome the shortcomings, the present invention tends to provide a cutter holding assembly to mitigate or obviate the aforementioned problems.

SUMMARY OF THE INVENTION

The main objective of the present invention is to provide a cutter holding assembly that has a tightening positioning assembly to reduce an assembly gap formed between the holder and the cutter to improve precision of machining. The cutter holding assembly has a holder, a cutter, and a tightening positioning assembly. The holder has an end surface and a first positioning recess recessed in the holder and having an opening formed in the end surface of the holder. The cutter is connected to the holder by a fastener and has an end abutting the end surface of the holder and a second positioning recess recessed in the end of the cutter near the holder. The tightening positioning assembly is mounted in the first positioning recess of the holder and the second positioning recess of the cutter and has a positioning block, two tightening elements, and an adjusting element.

The positioning block is mounted in the first positioning recess of the holder and the second positioning recess of the cutter and has an outer surface, two opposite side surfaces, two tightening grooves formed in the positioning block, and an adjusting hole. Each tightening groove has a respective side opening, and the side openings of the two tightening grooves are respectively formed in the two opposite side surfaces of the positioning block. The adjusting hole is recessed in the outer surface of the positioning block, is located between the two tightening grooves, and communicates with the two tightening grooves. The two tightening elements are respectively mounted in the two tightening grooves of the positioning block. The adjusting element is mounted in the adjusting hole of the positioning block, is connected with the positioning block by a threaded connection, and has a conical abutting surface formed around the adjusting element and having diameters gradually decreasing. The abutting surface of the adjusting element selectively abuts the tightening elements.

Other objects, advantages and novel features of the invention will become more apparent from the following detailed description when taken in conjunction with the accompanying drawings.

DETAILED DESCRIPTION OF PREFERRED EMBODIMENT

Figure 1:
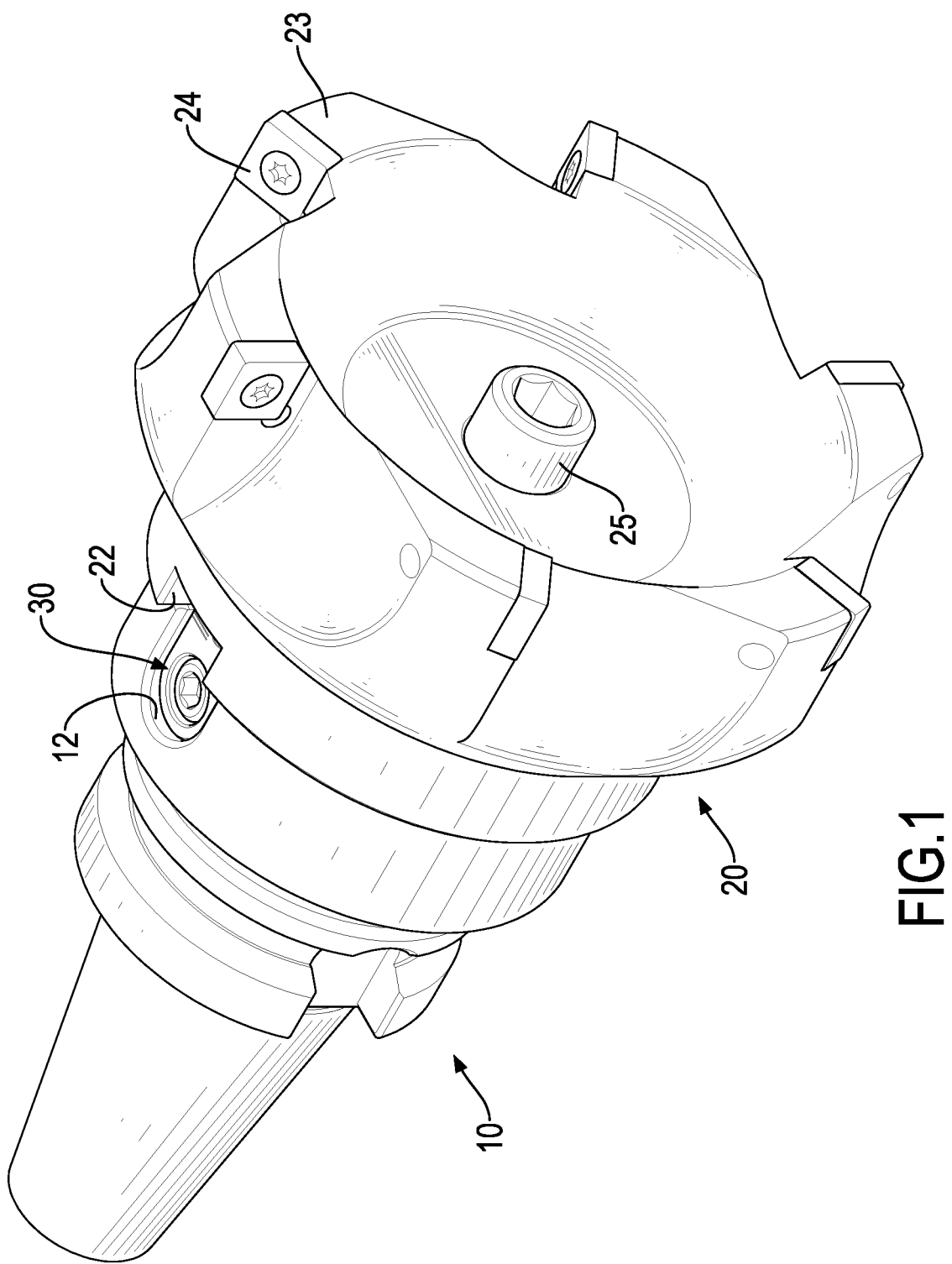
FIG. 1 is a perspective view of a cutter holding assembly in accordance with the present invention.
Figure 2:
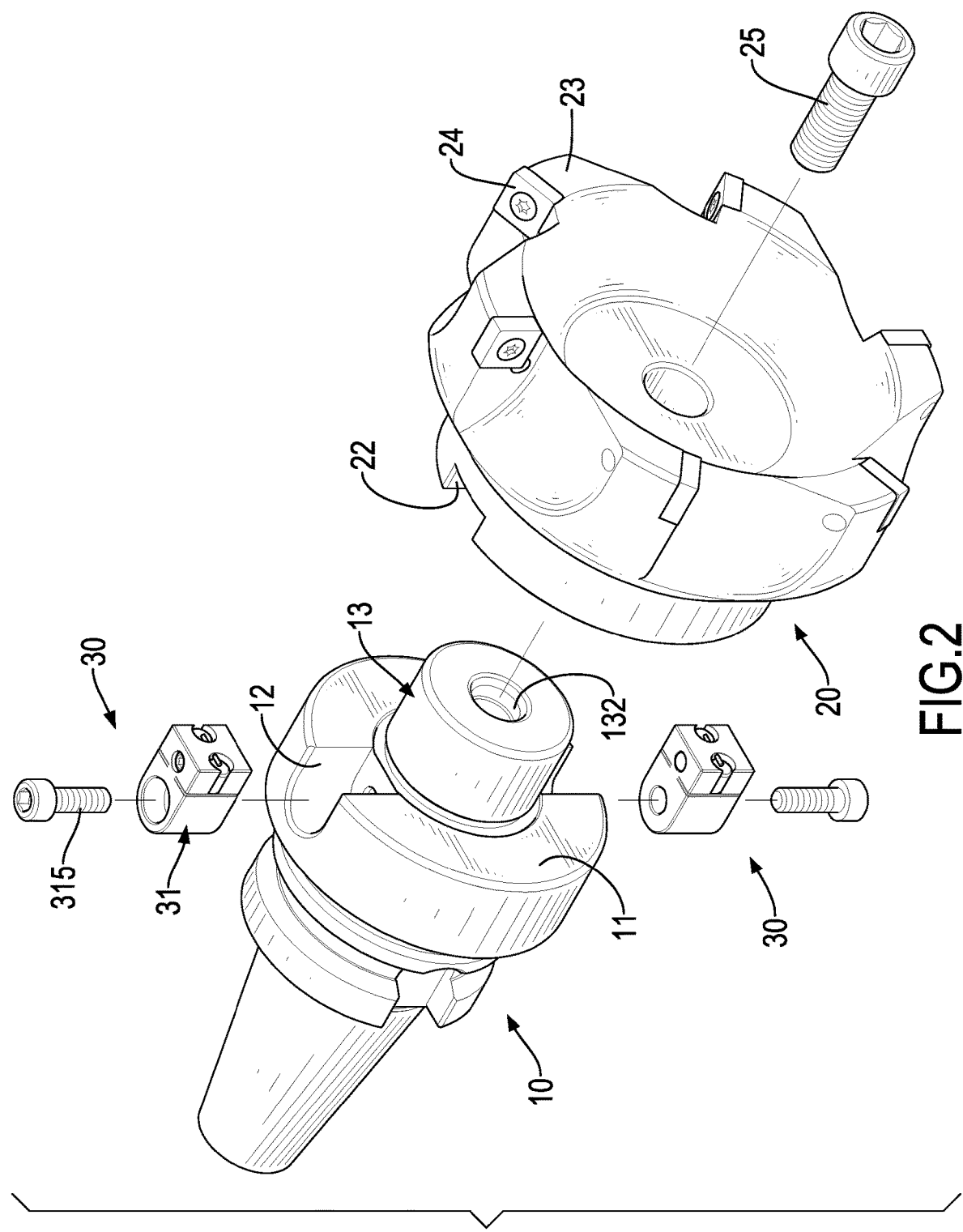
FIG. 2 is an exploded perspective view of the cutter holding assembly in FIG. 1.

With reference to FIGS. 1 and 2, an embodiment of a cutter holding assembly in accordance with the present invention has a holder 10, a cutter 20, and a tightening positioning assembly 30.

The holder 10 has an end surface 11, a connecting portion 13, and a first positioning recess 12. The connecting portion 13 is circular and protrudes from the end surface 11 of the holder 10. The connecting portion 13 has a threaded hole 132 axially formed in the connecting portion 13. The first positioning recess 12 is radially recessed in the holder 10 and has an opening formed in the end surface 11 of the holder 10.

The cutter 20 surrounds the connecting portion 13 of the holder 10, has an end abutting the end surface 11 of the holder 10, and is connected to the holder 10 by a fastener 25. The fastener 25 is mounted through an axis of the cutter 20 and is screwed with the threaded hole 132 of the connecting portion 13. The cutter 20 has a second positioning recess 22 recessed in the end of the cutter 20 near the holder 10. The second positioning recess 22 of the cutter 20 is aligned with the first positioning recess 12 of the holder 10. The cutter 20 may be a milling cutter having replaceable blades. The cutter 20 has multiple blade seats 23 formed on an end of the cutter 20 away from the holder 10 and arranged around the cutter 20 at angular intervals. Each blade seat 23 has a blade 24 fixed thereon by a fastening element.

Figure 3:
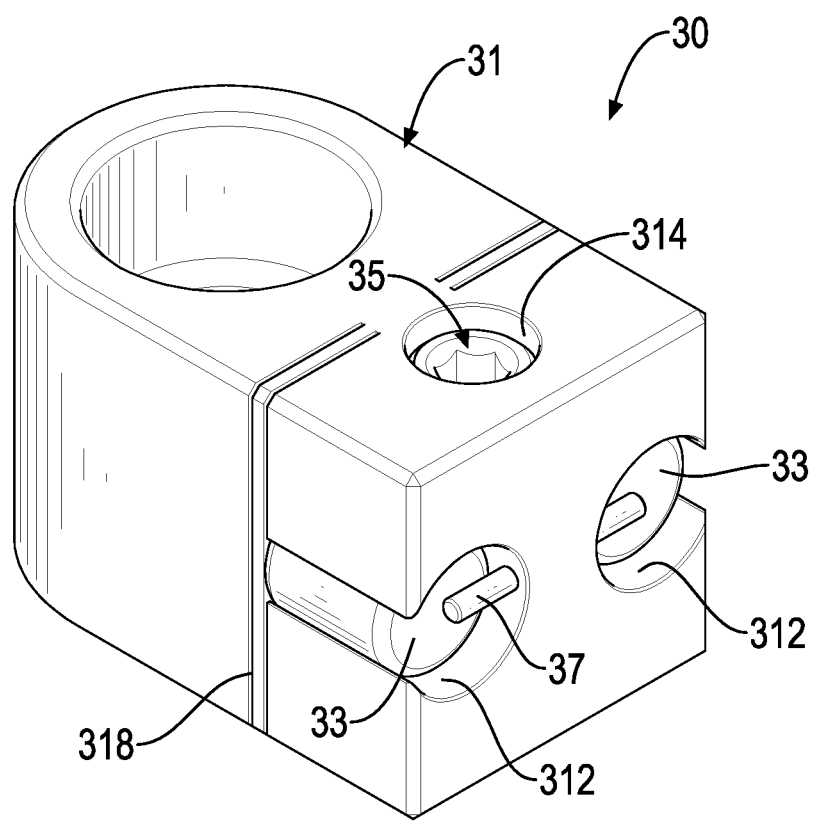
FIG. 3 is an enlarged perspective view of a tightening positioning assembly of the cutter holding assembly in FIG. 1.
Figure 4:
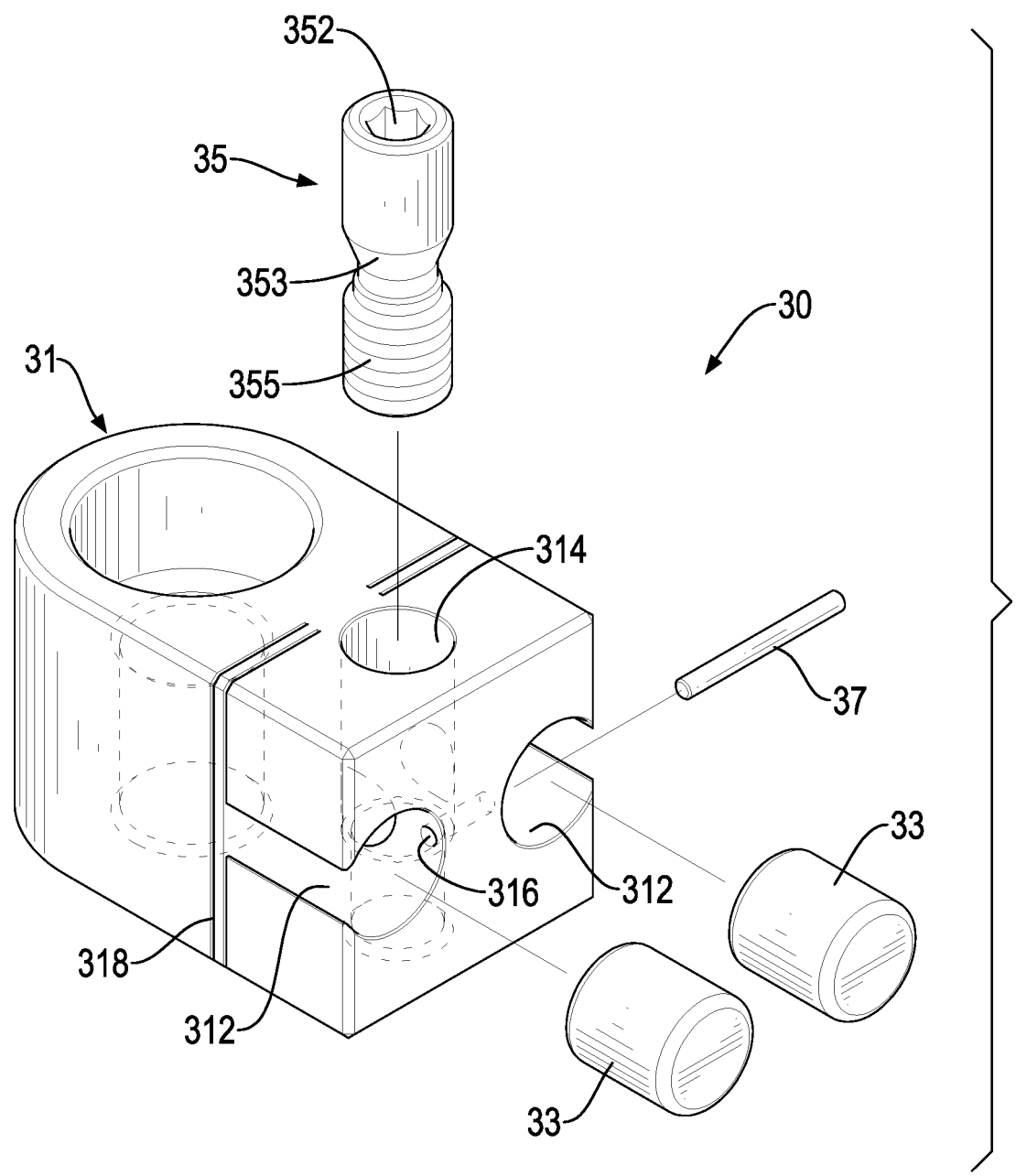
FIG. 4 is an exploded perspective view of the tightening positioning assembly of the cutter holding assembly in FIG. 3.

With reference to FIGS. 2 to 4, the tightening positioning assembly 30 is mounted in the first positioning recess 12 of the holder 10 and the second positioning recess 22 of the cutter 20. The tightening positioning assembly 30 has a positioning block 31, two tightening elements 33, and an adjusting element 35.

Figure 7:
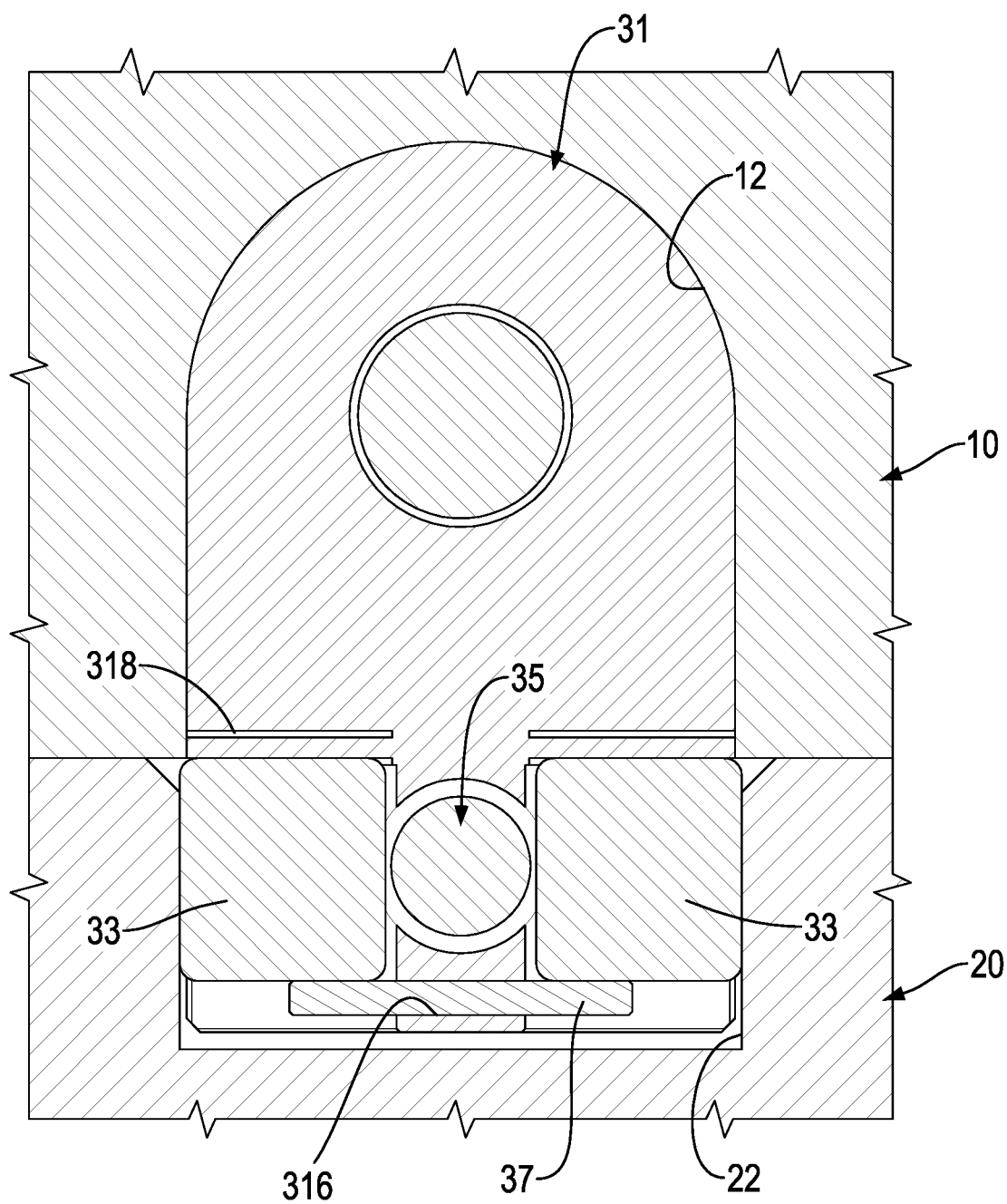
FIG. 7 is an enlarged cross sectional side view of the cutter holding assembly in FIG. 1.

With reference to FIGS. 2, 4, and 7, the positioning block 31 is mounted in the first positioning recess 12 of the holder 10 and the second positioning recess 22 of the cutter 20. In the present invention, the positioning block 31 is fixed in the first positioning recess 12 of the holder 10 by a positioning bolt 315, protrudes from the end surface 11 of the holder 10, and is inserted into the second positioning recess 22 of the cutter 20. A width of the second positioning recess 22 of the cutter 20 is larger than a width of the positioning block 31. The width of the second positioning recess 22 may be 0.3 millimeters to 0.5 millimeters larger than the width of the positioning block 31, whereby the positioning block 31 can be easily inserted into the second positioning recess 22 of the cutter 20.

Figure 5:
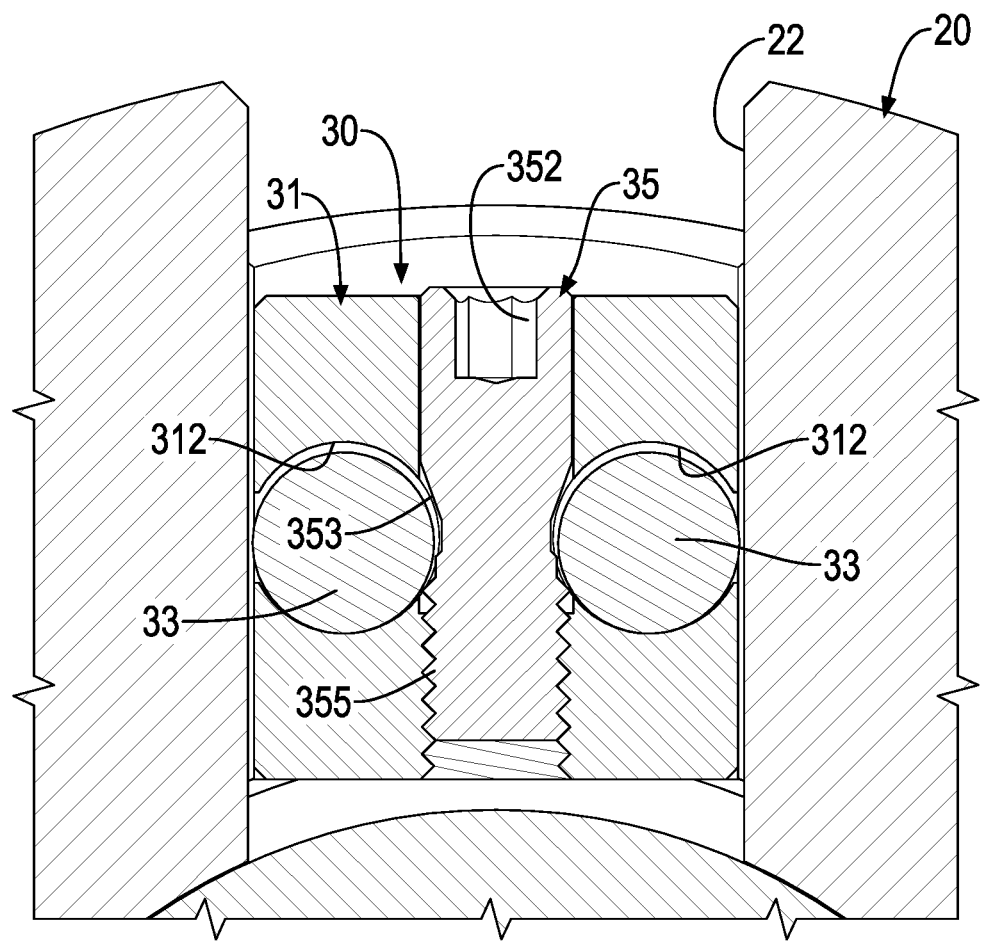
FIG. 5 is an enlarged cross sectional end view of the cutter holding assembly in FIG. 1.

With reference to FIGS. 4, 5, and 7, the positioning block 31 has an outer surface, two opposite side surfaces, two tightening grooves 312, and an adjusting hole 314. The two tightening grooves 312 are formed in the positioning block 31, and each one of the two tightening grooves 312 has a respective side opening. The side openings of the two tightening grooves 312 are respectively formed in the two opposite side surfaces of the positioning block 31. The two tightening grooves 312 are formed in the positioning block 31 that is mounted in the second positioning recess 22 of the cutter 20. The two tightening grooves 312 communicate with the second positioning recess 22 of the cutter 20 via the side openings of the two tightening grooves 312. The adjusting hole 314 is recessed in the positioning block 31 from the outer surface of the positioning block 31, is located between the two tightening grooves 312, and communicates with the two tightening grooves 312.

The two tightening elements 33 are respectively mounted in the two tightening grooves 312 of the positioning block 31. The adjusting element 35 is mounted in the adjusting hole 314 of the positioning block 31 and is connected with the positioning block 31 by a threaded connection. The adjusting element 35 has a conical abutting surface 353 formed around the adjusting element 35 and having diameters gradually decreasing. The abutting surface 353 of the adjusting element 35 selectively abuts the two tightening elements 33. The abutting surface 353 of the adjusting element 35 pushes the two tightening elements 33 to move opposite to each other while the adjusting element 35 is axially moving relative to the positioning block 31. The adjusting element 35 is cylindrical, and has an abutting segment and a threaded segment 355. The abutting segment of the adjusting element 35 corresponds to the two tightening grooves 312 in position. The abutting segment has diameters gradually decreasing to form the abutting surface 353 of the adjusting element 35. The threaded segment 355 has a thread formed around the threaded segment 355, and is connected with the positioning block 31 by the threaded connection.

Preferably, the adjusting element 35 has a socket 352 formed in an end of the adjusting element 35 away from the positioning block 31. The adjusting element 35 can be rotated by a tool inserted in the socket 352 of the adjusting element 35. The diameters of the abutting surface 353 gradually decrease from an end of the abutting surface 353 near the outer surface of the positioning block 31. The abutting segment of the adjusting element 35 is an annular groove radially recessed in the adjusting element 35. The threaded segment 355 is adjacent to an end of the abutting segment of the adjusting element 35 away from the outer surface of the positioning block 31.

The two tightening elements 33 may be round pins, respectively. The two tightening grooves 312 are recessed in and longitudinally extend from an end of the positioning block 31 near the cutter 20, and each tightening groove 312 has a respective end opening formed in the end of the positioning block 31 near the cutter 20 and a respective side opening formed in a respective side surface of the positioning block 31. Each tightening groove 312 has an inner diameter being larger than a diameter of each tightening element 33. A width of the side opening of each tightening groove 312 is smaller than the diameter of each tightening element 33. The two tightening elements 33 are respectively inserted into the two tightening grooves 312 from the end openings thereof. The two tightening elements 33 are engaged in the annular groove formed in the abutting segment of the adjusting element 35 and selectively protrude from the side openings of the two tightening grooves 312.

With reference to FIGS. 2, 4, and 7, preferably, the tightening positioning assembly 30 has a stopping element 37. The stopping element 37 abuts against the ends of the two tightening elements 33 away from the end surface 11 of the holder 10 to limit assembly positions of the two tightening elements 33. The stopping element 37 may be transversally inserted in the positioning block 31 and abuts against the two tightening elements 33. The positioning block 31 has a transversal hole 316 formed in the positioning block 31 near the end openings of the two tightening grooves 312, is spaced from the end openings of the two tightening grooves 312, and transversally communicates with the two tightening grooves 312. The stopping element 37 has a diameter being smaller than the diameter of each tightening elements 33 and a length being smaller than the width of the positioning block 31. The stopping element 37 is inserted in the transversal hole 316 of the positioning block 31 to prevent the two tightening elements 33 separating from the positioning block 31.

With reference to FIGS. 4 and 7, preferably, each side surface of the positioning block 31 has at least one slit 318 recessed therein to provide flexible deformation spaces for the positioning block 31. Each one of the at least one slit 318 is located near the end surface 11 of the holder 10. Each side surface of the positioning block 31 may have multiple slits 318 recessed therein at spaced intervals. One of the slits 318 formed in each side surface of the positioning block 31 communicates with the two tightening grooves 312 at the same side surface of the positioning block 31.

With reference to FIG. 2, preferably, the cutter holding assembly of the present invention has two said tightening positioning assemblies 30. The holder 10 has two said first positioning recesses 12 respectively formed in diametrically opposite sides of the holder 10. The cutter 20 has two said second positioning recesses 22 respectively formed in diametrically opposite sides of the cutter 20. The two tightening positioning assemblies 30 are respectively mounted in the two first positioning recesses 12 of the holder 10 and respectively inserted in the two second positioning recesses 22 of the cutter 20.

Figure 6:
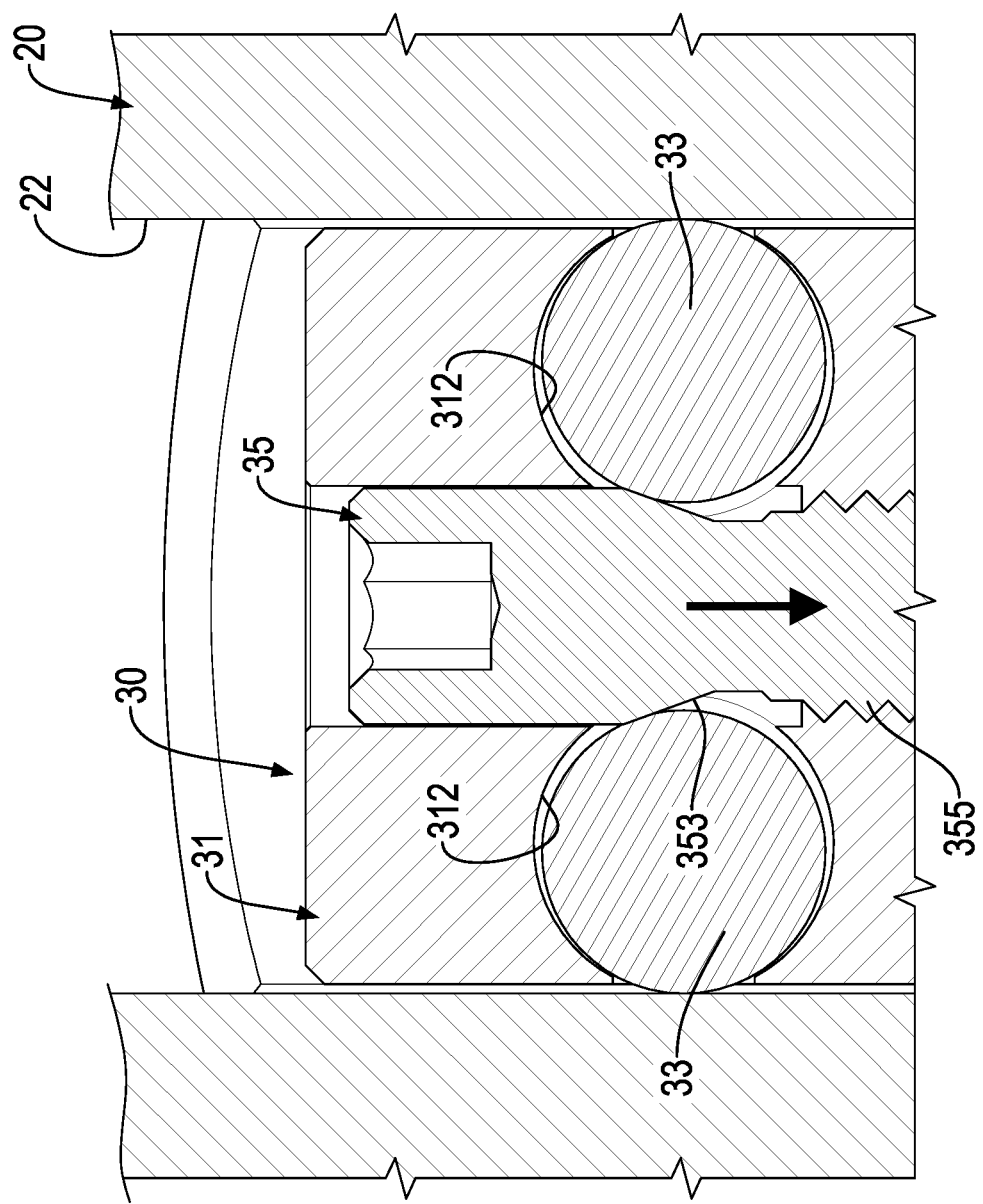
FIG. 6 is an enlarged operational cross sectional end view of the cutter holding assembly in FIG. 5.

With reference to FIGS. 5 and 6, after the cutter 20 is connected to the holder 10, the adjusting element 35 is rotated to move axially relative to the positioning block 31. The conical abutting surface 353 of the adjusting element 35 abuts against the two tightening elements 33 and pushes the two tightening elements 33 to move opposite to each other and to protrude from the side openings of the two tightening grooves 312. The two tightening elements 33 respectively tightly abut against the opposite side surfaces of the second positioning recess 22 to reduce an assembly gap formed between the positioning block 31 and the second positioning recess 22. The cutter 20 can be firmly and tightly connected to the holder 10. While rapidly spinning, the cutter holding assembly will have good balance and the vibrations will be reduced. The machining precision processed by the cutter holding assembly will be improved.

In another embodiment of the present invention, the positioning block 31 is fixed in the second positioning recess 22 of the cutter 20 and is inserted in the first positioning recess 12 of the holder 10. The two tightening elements 33 and the adjusting element 35 are mounted in the positioning block 31 that is mounted in the first positioning recess 12 of the holder 10. The two tightening elements 33 are pushed by the adjusting element 35 to tightly abut against the opposite side surfaces of the first positioning recess 12 of the holder 10, whereby the holder 10 and the cutter 20 can be firmly connected with each other.

What is claimed is:

1. A cutter holding assembly comprising:
   a holder having
      an end surface; and
      a first positioning recess recessed in the holder and having an opening formed in the end surface of the holder;
   a cutter connected to the holder by a fastener and having
      an end abutting the end surface of the holder; and
      a second positioning recess recessed in the end of the cutter near the holder; and
   a tightening positioning assembly mounted in the first positioning recess of the holder and the second positioning recess of the cutter and having
      a positioning block mounted in the first positioning recess of the holder and the second positioning recess of the cutter and having
         an outer surface;
         two opposite side surfaces;
         two tightening grooves formed in the positioning block, and each tightening groove having a respective side opening, the side openings of the two tightening grooves respectively formed in the two opposite side surfaces of the positioning block; and
         an adjusting hole recessed in the outer surface of the positioning block, located between the two tightening grooves, and communicating with the two tightening grooves;
      two tightening elements respectively mounted in the two tightening grooves of the positioning block; and
      an adjusting element mounted in the adjusting hole of the positioning block, connected with the positioning block by a threaded connection, and having
         a conical abutting surface formed around the adjusting element, having diameters gradually decreasing, and selectively abutting the tightening elements.

2. The cutter holding assembly as claimed in claim 1, wherein the adjusting element has
   an abutting segment corresponding to the two tightening grooves in position and having diameters gradually decreasing to form the abutting surface of the adjusting element; and
   a threaded segment adjacent to an end of the abutting segment away from the outer surface of the positioning block.

3. The cutter holding assembly as claimed in claim 2, wherein the diameters of the abutting surface of the adjusting element gradually decrease from an end of the abutting surface near the outer surface of the positioning block.

4. The cutter holding assembly as claimed in claim 3, wherein
   the positioning block is fixed in the first positioning recess of the holder;
   the two tightening grooves of the positioning block are formed in the positioning block that is mounted in the second positioning recess of the cutter; and
   the side openings of the two tightening grooves of the positioning block communicate with the second positioning recess of the cutter.

5. The cutter holding assembly as claimed in claim 4, wherein the two tightening grooves of the positioning block longitudinally extend from an end of the positioning block near the cutter, and each tightening groove has a respective end opening formed in the end of the positioning block near the cutter.

6. The cutter holding assembly as claimed in claim 5, wherein
   the two tightening elements are round pins;
   each tightening groove of the positioning block has an inner diameter being larger than a diameter of each tightening element; and
   a width of the side opening of each tightening groove is smaller than the diameter of each tightening element.

7. The cutter holding assembly as claimed in claim 6, wherein
   the tightening positioning assembly has a stopping element transversally inserted in the positioning block and abutting against ends of the two tightening elements away from the end surface of the holder.

8. The cutter holding assembly as claimed in claim 7, wherein each side surface of the positioning block has at least one slit recessed in the side surface of the positioning block.

9. The cutter holding assembly as claimed in claim 1, wherein
   the cutter holding assembly has two side tightening positioning assemblies;
   the holder has two said first positioning recesses respectively recessed in diametrically opposite sides of the holder;
   the cutter has two said second positioning recesses respectively recessed in diametrically opposite sides of the cutter; and
   the two said tightening positioning assemblies are respectively mounted in the two said first positioning recesses of the holder and respectively inserted in the two said second positioning recesses of the cutter.

10. The cutter holding assembly as claimed in claim 2, wherein
    the cutter holding assembly has two side tightening positioning assemblies;
    the holder has two said first positioning recesses respectively recessed in diametrically opposite sides of the holder;
    the cutter has two said second positioning recesses respectively recessed in diametrically opposite sides of the cutter;
    the two said tightening positioning assemblies are respectively mounted in the two said first positioning recesses of the holder and respectively inserted in the two said second positioning recesses of the cutter.

11. The cutter holding assembly as claimed in claim 3, wherein
    the cutter holding assembly has two side tightening positioning assemblies;

the holder has two said first positioning recesses respectively recessed in diametrically opposite sides of the holder;

the cutter has two said second positioning recesses respectively recessed in diametrically opposite sides of the cutter; and the two said tightening positioning assemblies are respectively mounted in the two said first positioning recesses of the holder and respectively inserted in the two said second positioning recesses of the cutter.

12. The cutter holding assembly as claimed in claim 4, wherein the cutter holding assembly has two side tightening positioning assemblies;

the holder has two said first positioning recesses respectively recessed in diametrically opposite sides of the holder;

the cutter has two said second positioning recesses respectively recessed in diametrically opposite sides of the cutter; and the two said tightening positioning assemblies are respectively mounted in the two said first positioning recesses of the holder and respectively inserted in the two said second positioning recesses of the cutter.

13. The cutter holding assembly as claimed in claim 5, wherein the cutter holding assembly has two side tightening positioning assemblies;

the holder has two said first positioning recesses respectively recessed in diametrically opposite sides of the holder;

the cutter has two said second positioning recesses respectively recessed in diametrically opposite sides of the cutter; and the two said tightening positioning assemblies are respectively mounted in the two said first positioning recesses of the holder and respectively inserted in the two said second positioning recesses of the cutter.

14. The cutter holding assembly as claimed in claim 6, wherein the cutter holding assembly has two side tightening positioning assemblies;

the holder has two said first positioning recesses respectively recessed in diametrically opposite sides of the holder;

the cutter has two said second positioning recesses respectively recessed in diametrically opposite sides of the cutter; and the two said tightening positioning assemblies are respectively mounted in the two said first positioning recesses of the holder and respectively inserted in the two said second positioning recesses of the cutter.

15. The cutter holding assembly as claimed in claim 7, wherein the cutter holding assembly has two side tightening positioning assemblies;

the holder has two said first positioning recesses respectively recessed in diametrically opposite sides of the holder;

the cutter has two said second positioning recesses respectively recessed in diametrically opposite sides of the cutter; and the two said tightening positioning assemblies are respectively mounted in the two said first positioning recesses of the holder and respectively inserted in the two said second positioning recesses of the cutter.

16. The cutter holding assembly as claimed in claim 8, wherein the cutter holding assembly has two side tightening positioning assemblies;

the holder has two said first positioning recesses respectively recessed in diametrically opposite sides of the holder;

the cutter has two said second positioning recesses respectively recessed in diametrically opposite sides of the cutter; and the two said tightening positioning assemblies are respectively mounted in the two said first positioning recesses of the holder and respectively inserted in the two said second positioning recesses of the cutter.

* * * * *